United States Patent
Sadanobu et al.

(10) Patent No.: US 6,797,801 B2
(45) Date of Patent: Sep. 28, 2004

(54) POLYIMIDE FILM AND PROCESS FOR PRODUCING THE SAME

(75) Inventors: Jiro Sadanobu, Iwakuni (JP); Rei Nishio, Iwakuni (JP); Susumu Honda, Iwakuni (JP); Tsutomu Nakamura, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/257,811

(22) PCT Filed: Apr. 20, 2001

(86) PCT No.: PCT/JP01/03405

§ 371 (c)(1),
(2), (4) Date: Oct. 17, 2002

(87) PCT Pub. No.: WO01/81456

PCT Pub. Date: Nov. 1, 2001

(65) Prior Publication Data

US 2003/0109669 A1 Jun. 12, 2003

(30) Foreign Application Priority Data

Apr. 20, 2000 (JP) ........................................ 2000-119490

(51) Int. Cl.$^7$ ........................ C08G 73/10; B32B 27/00; B29C 55/00; B29C 55/12

(52) U.S. Cl. .................... 528/170; 528/353; 428/473.5; 428/457; 428/458; 264/290.2; 264/291; 264/292; 264/299

(58) Field of Search ............................... 528/170, 353; 428/473.5, 457–458; 264/290.2, 291–292, 299

(56) References Cited

U.S. PATENT DOCUMENTS

| | | | | |
|---|---|---|---|---|
| 4,063,984 A | * | 12/1977 | Critchley | 524/408 |
| 4,405,550 A | * | 9/1983 | Hungerford | 264/216 |
| 4,426,486 A | * | 1/1984 | Hungerford | 524/600 |
| 4,795,798 A | * | 1/1989 | Tamai et al. | 528/185 |
| 4,923,968 A | * | 5/1990 | Kunimune et al. | 528/353 |
| 5,196,500 A | * | 3/1993 | Kreuz et al. | 528/125 |
| 5,219,977 A | * | 6/1993 | Kreuz | 528/125 |
| 5,260,407 A | * | 11/1993 | Saruwatari et al. | 528/183 |
| 5,300,619 A | * | 4/1994 | Okada et al. | 528/170 |
| 5,969,080 A | * | 10/1999 | Ieki et al. | 528/170 |
| 6,555,238 B2 | * | 4/2003 | Uhara et al. | 428/458 |
| 6,569,366 B1 | * | 5/2003 | Toyohara et al. | 264/48 |

FOREIGN PATENT DOCUMENTS

| | | |
|---|---|---|
| EP | 491307 A1 | 6/1992 |
| JP | 59-157319 | 9/1984 |
| JP | 62-77921 | 4/1987 |
| JP | 62-294519 | 12/1987 |
| JP | 63-6028 | 1/1988 |
| JP | 63-147625 | 6/1988 |
| JP | 63-242625 | 10/1988 |
| JP | 1-282219 | 11/1989 |
| JP | 4-189827 | 7/1992 |
| JP | 6-172529 | 6/1994 |
| JP | 9-188760 | 7/1997 |
| JP | 2001-81213 | 3/2001 |

OTHER PUBLICATIONS

Journal of Society of Textiles, *Calculation of Limiting Young's Moduli of Rigid–Rod Polymers Including Poly–p–Phenylene Benzobisthiazole (PBT)*, Kohji Tashiro, et al., 1987, vol. 43, pp. 78–91, the month in the date of the publication is not available.

Polymer Articles, *Molecular Orientation of Polypyromellitimide by Using Swollen Drawing of Homo–poly(amic acid) and Copoly(amic acid) Films*, Akiyoshi Masuda, et al., May 1999, vol. 56, No. 5, pp. 282–290.

Polymer Preprints, Japan, *Synthesis and Orientation Properties of Polyamic Acid Long Alkylesters and Production of Oriented Polyimides Fiber*, M. Kakimoto, et al., 1992, vol. 41, No.9, pp. 3752–3754, the month in the date of the publication is not available.

S.I. Kim, et al, "Structure and properties of rodlike poly(p–phenylene pyromellitimide)s containing short side groups," *Polymer*, 40 (1999), pp. 1603–1610.

M. Ree, et al, "Structure, chain orientation, and properties in thin films of aromatic polyimides with various chain rigidities," *J. Appl. Phys.*, 81 (2), Jan. 15, 1997, pp. 698–708.

* cited by examiner

Primary Examiner—P. Hampton Hightower
(74) Attorney, Agent, or Firm—Sughrue Mion, PLLC

(57) ABSTRACT

An oriented polyimide film of high strength and a production process therefor. The process basically comprises stretching a gelled film and then imidating the film. The gelled film is formed by introducing a polyamic acid solution into a condensation agent solution. The gelled film is swollen with a solvent at the time of stretching.

16 Claims, No Drawings

US 6,797,801 B2

POLYIMIDE FILM AND PROCESS FOR PRODUCING THE SAME

TECHNICAL FIELD

The present invention relates to a polyimide film having highly improved mechanical properties and a production process thereof.

BACKGROUND ART

A wholly aromatic polyimide has been widely used in industry due to its excellent heat resistance and mechanical properties. Particularly, its film occupies an important position as a substrate for a thin-layer electronic part including an electronic packaging application. In recent years, a thinner polyimide film is desired in response to a strong demand for smaller electronic parts. However, it is an essential requirement from viewpoints of actual use and handling of the film that the film have high rigidity along with a decrease in thickness. Although the wholly aromatic polyimide film has a rigid structure, it cannot be necessarily said that the film has a truly high Young's modulus as compared with, for example, a wholly aromatic polyamide film. It is a current situation that a Young's modulus of a commercially available polyimide film having the highest Young's modulus is merely as high as 9 GPa.

As a method of achieving a high Young's modulus in the wholly aromatic polyimide film, (1) application of a chemical structure which is rigid and has high linearity to a molecular skeleton constituting a polyimide and (2) orientation of molecules of the polyimide by a physical technique are considered. As the chemical structure of (1), a raw material to attain the chemical structure has been studied by use of various combinations of pyromellitic acid or 3,3',4,4'-biphenyltetracarboxylic acid as an acid component and paraphenylenediamine, benzidine or nucleus substituted compounds thereof as an amine component. Of the studied raw materials, polyparaphenylenepyromellitimide is the most promising raw material as a raw material for a film having a high Young's modulus since it has the highest theoretical elastic modulus (refer to Tashiro et al., Journal of Society of Textiles, Vol. 43, p. 78 (1987)) and its raw materials are inexpensive. However, despite its potential, a conventional polyparaphenylenepyromellitimide film is extremely brittle, and a polyparaphenylenepyromellitimide film which is balanced and has a high Young's modulus is not yet attained.

As a method for overcoming the situation, a method of chemically cyclizing a polyamide acid solution obtained by a reaction between paraphenylenediamine and pyromellitic anhydride is proposed in JP-A 1-282219. However, a Young's modulus of a polyparaphenylenepyromellitimide film obtained by the method is merely as high as 8.5 GPa.

JP-A 6-172529 discloses that a film having a Young's modulus of 20.1 GPa is obtained by flow-casting a dope produced by adding a large amount of acetic anhydride to a polyamide acid solution obtained by a reaction between nucleus-substituted paraphenylenediamine and pyromellitic anhydride, drying the cast dope at low temperatures under a reduced pressure and heat-treating the resulting dope. However, this method is an industrially unrealistic technique since it requires dry treatment at low temperatures over a few hours. Further, it is also disclosed that a film which can be obtained when the technique is applied to polyparaphenylenepyromellitimide is only a film which is so brittle that it cannot undergo even mechanical measurements. Therefore, the effect of the technique is limited. Thus, a technique for attaining a film having a high Young's modulus which can be widely used in aromatic polyimides which are rigid is not completed. In particular, a polyparaphenylenepyromellitimide film having a high Young's modulus and practical toughness is not known.

Meanwhile, as a method for orienting a polyimide by stretching, a method in which a polyamic acid solution which is a precursor of polyparaphenylenepyromellitimide is formed into a film, dried, monoaxially stretched in a solvent and formed into an imide is disclosed in Polymer Articles, Vol. 56, No. 5, pp. 282 to 290. Further, a method in which a precursor polyamic ester having an ester group of a long chain (having 10 to 18 carbon atoms) introduced into a polymer chain is wet-spun, oriented by stretching and formed into an imide by heating is proposed in Polymer Preprint Japan, Vol. 41, No. 9 (1992) 3752. However, both of the publications set forth nothing about a biaxially stretched film which is balanced in a plane.

Therefore, a polyparaphenylenepyromellitimide film with a high Young's modulus which is balanced in a plane is not yet known.

DISCLOSURE OF THE INVENTION

An object of the present invention is to provide a polyimide film having mechanical properties, particularly a Young's modulus, improved by a high degree of orientation which could not be achieved by the prior art.

Another object of the present invention is to provide a polyparaphenylenepyromellitimide film having a high Young's modulus.

Another object of the present invention is to provide a process for producing the above film of the present invention.

Other objects and advantages of the present invention will be apparent from the following description.

According to the present invention, firstly, the above objects and advantages of the present invention are achieved by a polyimide film which comprises a polyimide consisting essentially of a diamine component and a tetracarboxylic acid component, the diamine component comprising a p-phenylenediamine component whose amount is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, and which has two directions each having a Young's modulus of higher than 10 GPa and perpendicular to each other in a film plane.

According to the present invention, secondly, the above objects and advantages of the present invention are achieved by a process (hereinafter may be referred to as "first production process") for producing a polyimide film which comprises the steps of:

(1) preparing a solution of polyamic acid in a solvent, the polyamic acid consisting essentially of a diamine component and a tetracarboxylic acid component, the diamine component comprising a p-phenylenediamine component whose amount is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N-dimethylacetamide, N-methylpyrrolidone and 1,3-dimethylimidazolidinone, (2) immersing a film obtained by flow casting the solution prepared in the above (1) on a substrate into an isoimidating solution produced by dissolving dicyclohexylcarbodiimide in at least one solvent selected from the above solvents, with the film being attached to the substrate, so as to form a gelled film in which at least a portion of the polyamic acid has been converted into a polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

Further, according to the present invention, thirdly, the above objects and advantages of the present invention are achieved by a process (hereinafter may be referred to as "second production process") for producing a polyimide film which comprises the steps of:

(1) preparing a solution of polyamic acid in a solvent, the polyamic acid consisting of a diamine component and a tetracarboxylic acid component, the diamine component comprising a p-phenylenediamine component whose amount is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N-dimethylacetamide, N-methylpyrrolidone and 1,3-dimethylimidazolidinone, (2) immersing a film obtained by flow casting the solution prepared in the above (1) on a substrate into a mixture comprising at least one solvent selected from the above solvents, acetic anhydride and an organic amine compound, with the film being attached to the substrate, so as to form a gelled film in which at least a portion of the polyamic acid has been converted into a polyimide or polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

PREFERRED EMBODIMENT OF THE INVENTION

Firstly, the polyimide film of the present invention will be described. The diamine component constituting the polyimide comprises p-phenylenediamine and an aromatic diamine other than p-phenylenediamine.

Illustrative examples of the aromatic diamine component other than p-phenylenediamine include m-phenylenediamine, 1,4-diaminonaphthalene, 1,5-diaminonaphthalene, 1,8-diaminonaphthalene, 2,6-diaminonaphthalene, 2,7-diaminonaphthalene, 2,6-diaminoanthracene, 2,7-diaminoanthracene, 1,8-diaminoanthracene, 2,4-diaminotoluene, 2,5-diamino(m-xylene), 2,5-diaminopyridine, 2,6-diaminopyridine, 3,5-diaminopyridine, 2,4-diaminotoluenebenzidine, 3,3'-diaminobiphenyl, 3,3'-dichlorobenzidine, 3,3'-dimethylbenzidine, 3,3'-dimethoxybenzidine, 2,2'-diaminobenzophenone, 4,4'-diaminobenzophenone, 3,3'-diaminodiphenyl ether, 4,4'-diaminodiphenyl ether, 3,4'-diaminodiphenyl ether, 3,3'-diaminodiphenylmethane, 4,4'-diaminodiphenylmethane, 4,4'-diaminodiphenylmethane, 3,4'-diaminodiphenylsulfone, 4,4'-diaminodiphenylsulfone, 3,3'-diaminodiphenylsulfide, 3,4'-diaminodiphenylsulfide, 4,4'-diaminodiphenylsulfide, 4,4'-diaminodiphenyl thioether, 4,4'-diamino-3,3',5,5'-tetramethyldiphenyl ether, 4,4'-diamino-3,3',5,5'-tetraethyldiphenyl ether, 4,4'-diamino-3,3',5,5'-tetramethyldiphenylmethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 2,6-bis(3-aminophenoxy)pyridine, 1,4-bis(3-aminophenylsulfonyl)benzene, 1,4-bis(4-aminophenylsulfonyl)benzene, 1,4-bis(3-aminophenyl thioether)benzene, 1,4-bis(4-aminophenyl thioether) benzene, 4,4'-bis(3-aminophenoxy)diphenyl sulfone, 4,4'-bis(4-aminophenoxy)diphenyl sulfone, bis(4-aminophenyl) amine, bis(4-aminophenyl)-N-methylamine, bis(4-aminophenyl)-N-phenylamine, bis(4-aminophenyl) phosphine oxide, 1,1-bis(3-aminophenyl)ethane, 1,1-bis(4-aminophenyl)ethane, 2,2-bis(3-aminophenyl)propane, 2,2-bis(4-aminophenyl)propane, 2,2-bis(4-amino-3,5-dimethylphenyl)propane, 4,4'-bis(4-aminophenoxy) biphenyl, bis[4-(3-aminophenoxy)phenyl]sulfone, bis[4-(4-aminophenoxy)phenyl]sulfone, bis[4-(4-aminophenoxy) phenyl]ether, bis[4-(4-aminophenoxy)phenyl]methane, bis [3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, 2,2-bis[4-(4-aminophenoxy) phenyl]propane, 2,2-bis[3-methyl-4-(4-aminophenoxy) phenyl]propane, 2,2-bis[3-chloro-4-(4-aminophenoxy) phenyl]propane, 2,2-bis[3,5-dimethyl-4-(4-aminophenoxy) phenyl]propane, 2,2-bis[4-(4-aminophenoxy)phenyl] butane, 2,2-bis[3-methyl-4-(4-aminophenoxy)phenyl] butane, 2,2-bis[3,5-dimethyl-4-(4-aminophenoxy)phenyl] butane, 2,2-bis[3,5-dibromo-4-(4-aminophenoxy)phenyl] butane, 1,1,1,3,3,3-hexafluoro-2,2-bis(4-aminophenyl) propane, 1,1,1,3,3,3-hexafluoro-2,2-bis[3-methyl-4-(4-aminophenoxy) phenyl]propane, and substitution products thereof resulting from substitution of a halogen atom or alkyl group into an aromatic nucleus.

The diamine component comprises either p-phenylenediamine alone or a combination of p-phenylenediamine and an aromatic diamine other than p-phenylenediamine which is exemplified by the compounds enumerated above. In the latter case, p-phenylenediamine constitutes more than 80 mol %, preferably more than 90 mol %, of a total amount of the diamine component, that is, an aromatic diamine other than p-phenylenediamine constitutes less than 20 mol %, preferably less than 10 mol %, of the total amount of the diamine component.

Meanwhile, the tetracarboxylic acid component constituting the polyimide comprises pyromellitic acid and an aromatic tetracarboxylic acid other than pyromellitic acid.

Illustrative examples of the aromatic tetracarboxylic acid component other than pyromellitic acid include 1,2,3,4-benzenetetracarboxylic dianhydride, 2,3,5,6-pyridinetetracarboxylic dianhydride, 2,3,4,5-thiophenetetracarboxylic dianhydride, 2,2',3,3'-benzophenonetetracarboxylic dianhydride, 2,3',3,4'-benzophenonetetracarboxylic dianhydride, 3,3',4,4'-benzophenonetetracarboxylic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-p-terphenyltetracarboxylic dianhydride, 2,2',3,3'-p-terphenyltetracarboxylic dianhydride, 2,3,3',4'-p-terphenyltetracarboxylic dianhydride, 1,2,4,5-naphthalenetetracarboxylic dianhydride, 1,2,5,6-naphthalenetetracarboxylic dianhydride, 1,2,6,7-naphthalenetetracarboxylic dianhydride, 1,4,5,8-naphthalenetetracarboxylic dianhydride, 2,3,6,7-naphthalenetetracarboxylic dianhydride, 2,3,6,7-anthracenetetracarboxylic dianhydride, 1,2,5,6-anthracenetetracarboxylic dianhydride, 1,2,6,7-phenanthrenetetracarboxylic dianhydride, 1,2,7,8-phenanthrenetetracarboxylic dianhydride, 1,2,9,10-phenanthrenetetracarboxylic dianhydride, 3,4,9,10-perylenetetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, 1,4,5,8-tetrachloronaphthalene-2,3,6,7-tetracarboxylic dianhydride, bis(2,3-dicarboxyphenyl)ether dianhydride, bis(3,4-dicarboxyphenyl)ether dianhydride, bis(2,3-dicarboxyphenyl)methane dianhydride, bis(3,4-dicarboxyphenyl)methane dianhydride, bis(2,3-dicarboxyphenyl)sulfone dianhydride, bis(3,4-dicarboxyphenyl)sulfone dianhydride, 1,1-bis(2,3-dicarboxyphenyl)ethane dianhydride, 1,1-bis(3,4-dicarboxyphenyl)ethane dianhydride, 2,2-bis(2,3-dicarboxyphenyl)propane dianhydride, 2,2-bis(3,4-dicarboxyphenyl)propane dianhydride, 2,6-bis(3,4-dicarboxyphenyl)pyridine dianhydride, 1,1,1,3,3,3-hexafluoro-2,2-bis(3,4-dicarboxyphenyl) propane dianhydride, and bis(3,4-dicarboxyphenyl)dimethylsilane dianhydride.

The tetracarboxylic acid component comprises either pyromellitic acid alone or a combination of pyromellitic acid and an aromatic tetracarboxylic acid other than pyromellitic acid which is exemplified by the compounds enumerated above. In the latter case, pyromellitic acid constitutes more than 80 mol %, preferably more than 90 mol %, of a total amount of the tetracarboxylic acid component, that is, an aromatic tetracarboxylic acid other than pyromellitic acid constitutes less than 20 mol %, preferably less than 10 mol %, of the total amount of the tetracarboxylic acid component.

A film of the present invention which comprises a polyimide composed of a diamine component comprising 100 mol % of the p-phenylenediamine component and 100 mol % of the pyromellitic acid component exhibits a more desirable Young's modulus.

The polyimide constituting the polyimide film of the present invention preferably has a percentage of imido groups of not lower than 95%. When the percentage of imido groups is lower than 95%, hydrolysis resistance of the polyimide film deteriorates. The percentage of imido groups is defined in Examples.

The polyimide film of the present invention has a high Young's modulus which has heretofore not been attained and a practically excellent characteristic that a balance of Young's moduli in a film plane is excellent. That is, two directions each having a Young's modulus of higher than 10 GPa and perpendicular to each other are present in the film plane. Preferably, two directions each having a Young's modulus of higher than 12 GPa and perpendicular to each other are present in the film plane.

The present inventors have found that brittleness of the conventionally known polyparaphenylenepyromellitimide having such a high Young's modulus can be overcome by imparting a special fine structure to the polyimide film. That is, in the case of the polyimide film of the present invention, the following relational expressions (1), (2) and (3) preferably hold between a refractive index nz in a direction perpendicular to the film plane and a density d of the film.

$$1.61 > nz > 1.55 \quad (1)$$

$$1.57 > d > 1.46 \quad (2)$$

$$2.0d - 1.33 > nz > 1.5d - 0.77 \quad (3)$$

nz is a measure for orientation of molecules of the polyimide. A decrease in value of nz indicates an increase in degree of orientation in the plane. When nz is 1.61 or larger, a low Young's modulus is exhibited due to insufficient orientation, while when nz is 1.55 or smaller, stretchability of the film becomes low due to excessive orientation. The density d is a measure associated with crystallinity of the polyimide and a degree of compactness of the fine structure thereof. When d is larger than 1.57, toughness of the film is insufficient, while when it is smaller than 1.46, the film has insufficient crystallinity, an increased water absorption property and poor dimensional stability. It is known that in the case of a general polymer, a high density can be attained by increasing a degree of orientation. In the case of the polyimide film of the present invention, surprisingly, when nz is decreased and the density d is lowered by orientation, a polyimide film having both high strength and a high Young's modulus can be attained. When nz is larger than 2.0d−1.33, orientation is insufficient in contrast to crystallinity, so that the film becomes brittle, while when nz is smaller than 1.5d−0.77, the crystallinity is insufficient in contrast to the orientation, so that the film has an increased water absorption property and poor dimensional stability.

In this case, when d is larger than 1.57, toughness of the film is insufficient, while when it is smaller than 1.46, the film has insufficient crystallinity, an increased water absorption property and poor dimensional stability.

The polyimide film of the present invention preferably has a tensile strength in one direction of not lower than 0.3 GPa, more preferably not lower than 0.4 GPa.

The present inventors have studied a technique for stretching an aromatic polyimide having a rigid structure to a high degree so as to orient molecules thereof. As a result, they have found it based on a fact that a gel prepared by chemically treating a precursor amic acid by a specific method exhibits high stretchability at low temperatures near room temperature, that a polyimide film having a significantly improved Young's modulus and balanced mechanical properties in a plane can be obtained by stretching the gel in a swollen state and then heat treating the stretched film. Further, they have also found that when the gel preparation method and the gel stretching method are applied to polyparaphenylenepyromellitimide, polyparaphenylenepyromellitimide with a balanced Young's modulus and practical strength and toughness which has heretofore been unable to be attained can be obtained. The present invention has been completed by these findings.

Next, the processes of the present invention for producing a polyimide film will be described in detail.

The first production process of the present invention comprises the following steps (1) to (4), that is, (1) preparing a solution of polyamic acid in a solvent, the polyamic acid consisting of a diamine component and a tetracarboxylic acid component, the diamine component comprising p-phenylenediamine whose amount is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N-dimethylacetamide, N-methylpyrrolidone and 1,3-dimethylimidazolidinone, (2) immersing a film obtained by flow casting the solution prepared in the above (1) on a substrate into an isoimidating solution produced by dissolving dicyclohexylcarbodiimide in at least one solvent selected from the above solvents, with the film being attached to the substrate, so as to form a gelled film in which at least a portion of the polyamic acid has been converted into a polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

In the step (1), a solution of polyamic acid in a solvent is prepared. The polyamic acid comprises such a diamine component and tetracarboxylic acid component as described above. Specific examples of an aromatic diamine other than p-phenylenediamine which constitutes the diamine component and an aromatic tetracarboxylic acid other than pyromellitic acid are the same as those enumerated for the polyimide. The diamine component of the polyamic acid comprises either p-phenylenediamine alone or a combination of p-phenylenediamine and such an aromatic diamine other than p-phenylenediamine as those enumerated above. In the latter case, p-phenylenediamine constitutes more than 80 mol %, preferably more than 90 mol %, of a total amount of the diamine component, that is, the aromatic diamine other than p-phenylenediamine constitutes less than 20 mol %, preferably less than 10 mol %, of the total amount of the diamine component.

Meanwhile, the tetracarboxylic acid component of the polyamic acid comprises either pyromellitic acid alone or a combination of pyromellitic acid and such an aromatic tetracarboxylic acid other than pyromellitic acid as those enumerated above. In the latter case, pyromellitic acid constitutes more than 80 mol %, preferably more than 90 mol %, of a total amount of the tetracarboxylic acid component, that is, the aromatic tetracarboxylic acid other than pyromellitic acid constitutes less than 20 mol %, preferably less than 10 mol %, of the total amount of the tetracarboxylic acid component.

Further, in producing the polyamic acid, these diamine and acid anhydride are desirably used in a diamine to acid anhydride molar ratio of preferably 0.90 to 1.10, more preferably 0.95 to 1.05.

Terminals of the polyamic acid are preferably blocked. The terminals of the polyamic acid may be blocked by use of a terminal blocking agent. Illustrative examples of the terminal blocking agent include phthalic anhydride and substitution products thereof, hexahydrophthalic anhydride and substitution products thereof, and succinic anhydride and substitution products thereof, and its amine component is exemplified by aniline and substitution products thereof. An amine component is exemplified by aniline and substitution products thereof.

As the solvent, N,N-dimethylformamide, N,N-dimethylacetamide, N-methylpyrrolidone and 1,3-dimethylimidazolidinone are used. These solvents can be used solely or in combination of two or more.

According to the step (1), a solution of polyamic acid in a solvent which has a solid content of preferably 0.5 to 30 wt %, more preferably 2 to 15 wt %, is prepared.

Then, in the step (2), a film obtained by flow casting the solution prepared in the above step (1) on a substrate is immersed in an isoimidated solution together with the substrate.

To flow-cast the solution obtained in the above step (1) on the substrate, any film forming method such as generally known wet and dry molding methods may be used. The film forming method is exemplified by a die extrusion method, casting using an applicator and a method using a coater. As the substrate on which the polyamic acid is flow-cast, a metal belt, a metal casting drum or the like can be used. Alternatively, the solution of the polyamic acid may be flow-cast onto a film of an organic polymer such as a polyester or polypropylene and then introduced into a condensation agent solution directly. These steps are preferably carried out under a low-moisture atmosphere. The isoimidated solution is prepared by dissolving dicyclohexylcarbodiimide in at least one solvent selected from the same solvents as used in the above step (1).

The concentration of hexylcarbodiimide in the isoimidated solution is not particularly limited but is preferably 0.5 to 99 wt % to cause a reaction to fully proceed. A reaction temperature is not particularly limited but may be a temperature within a range from a freezing point of the isoimidated solution to a boiling point thereof.

In the step (2), a gelled film in which at least a portion of the polyamic acid has been converted into a polyisoimide is formed. When the gelled film has a percentage of isoimido groups of not lower than 90%, a high stretch ratio is attained advantageously.

It can be said that the first production process has one of its greatest characteristics in that it obtains the unstretched gelled film which is homogeneously and highly swollen and has excellent stretchability in the step (2).

In the step (3), the unstretched gelled film obtained in the step (2) is separated from the substrate and then subjected to biaxial stretching. After separated from the substrate, the unstretched film may be rinsed, or not be rinsed, before subjected to biaxial stretching. To rinse the unstretched film, the same solvents as those used in the above step (1) are used, for example.

The unstretched film can be stretched in longitudinal and transverse directions at a stretch ratio of 1.1 to 6.0. A stretch temperature is not particularly limited and may be any temperature at which stretchability does not deteriorate by the solvent evaporation. For instance, a temperature within a range from −20° C. to +80° C. is preferred. The unstretched film may be stretched by sequential or simultaneous biaxial stretching, in a solvent, in the air, in an inert atmosphere or in a low temperature heated condition.

The gelled film to be subjected to biaxial stretching in the step (3) preferably has a degree of swelling of 300 to 5,000%. Thereby, a high stretch ratio is attained. When it is lower than 300%, stretchability is not sufficient, while when it is higher than 5,000%, strength of the gel deteriorates, thereby making it difficult to handle the film.

Finally, in the step (4), a biaxially stretched film obtained in the step (3) is subjected to heat treatment so as to form a biaxially oriented polyimide film.

Illustrative examples of a method for heat-treating the film include hot air heating, vacuum heating, infrared heating, microwave heating as well as a method of heating the film by contacting the film with a hot plate or hot roll. During the heat treatment, it is preferred to increase a temperature stepwise so as to promote imidation.

The heat treatment is preferably carried out at 300 to 550° C. with the film held at a specific length or under tension. Thereby, relaxation of orientation is suppressed, thereby making it possible to achieve a percentage of imido groups of higher than 95%.

The biaxially stretched film may be rinsed to remove the solvent therefrom before subjected to the heat treatment. To rinse the film, a solvent which can dissolve the solvent such as a lower alcohol, e.g., isopropanol, a higher alcohol, e.g., octyl alcohol, an aromatic hydrocarbon, e.g., toluene and xylene, an ether-based solvent, e.g., dioxane, and a ketone-based solvent, e.g., acetone and methyl ethyl ketone, may be used.

Next, the second production process of the present invention will be described. The second production process comprises the following steps (1) to (4), that is, (1) preparing a solution of polyamic acid in a solvent, the polyamic acid consisting of a diamine component and a tetracarboxylic acid component, the diamine component comprising p-phenylenediamine whose amount-is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N-dimethylacetamide, N-methylpyrrolidone and 1,3-dimethylimidazolidinone, (2) immersing a film obtained by flow casting the solution prepared in the above (1) on a substrate into a solution obtained by dissolving acetic anhydride and an organic amine compound in at least one solvent selected from the above solvents, with the film being attached to the substrate, so as to form a gelled film in which at least a portion of the polyamic acid has been converted into a polyimide or polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

The step (1) is the same as the step (1) in the first production process.

Then, in the step (2), a film obtained by flow casting the solution prepared in the above (1) onto a substrate is immersed into a solution obtained by dissolving acetic anhydride and an organic amine in at least one solvent selected from the same solvents as used in the above step (1), with the film being attached to the substrate.

The organic amine compound used acts as a reaction catalyst for acetic anhydride and polyamic acid. For example, a tertiary aliphatic amine such as trimethylamine, triethylamine, tributylamine, diisopropylethylamine and triethylenediamine; or a heterocyclic compound such as an aromatic amine, e.g., N,N-dimethylaniline and 1,8-bis(N,N-dimethylamino)naphthalene, pyridine and derivatives thereof, picoline and derivatives thereof, lutidine, quinoline, isoquinoline, 1,8-diazabicyclo[5.4.0]undecene and N,N-dimethylaminopyridine can be used. Of these, pyridine and picoline are preferred from the viewpoint of economy. Further, triethylenediamine and N,N-dimethylaminopyridine are also preferably used since they can achieve an extremely high percentage of imido groups and give a gelled film having high water resistance in combination with acetic anhydride. The amount of the organic amine compound based on acetic anhydride is not particularly limited but is not less than 0.5 mol %, preferably not less than 10 mol %.

The concentration of acetic anhydride in the mixed solution is not particularly limited but is preferably 0.5 to 99 wt % so as to cause a reaction to fully proceed. It is more preferably 30 to 99 wt %. A reaction temperature is not particularly limited but may be a temperature within a range from a freezing point of the mixed solution and a boiling point thereof.

It can be said that the second production process has one of its greatest characteristics in that it obtains an unstretched gelled film which is homogeneously and highly swollen and has excellent stretchability by causing acetic anhydride and polyamic acid to react with each other in the presence of an organic amine compound as a catalyst in a solvent which can dissolve the polyamic acid in the step (2).

Subsequently, in the second production process, the step (3) and the step (4) are performed successively. These steps are the same as the steps (3) and (4) in the first production process.

Biaxially oriented polyimide film obtained by the first and second production processes in the manners as described above are a polyimide film with a high Young's modulus which has molecular chains strongly oriented in a film plane and is excellent in balance in the plane. These films have Young's moduli measured in two directions perpendicular to each other in the plane of higher than 10 GPa, more preferably 12 GPa, and have improved strength ascribable to a special fine structure formed by stretching and orientation. Such a polyimide film with a high Young's modulus has high rigidity. Hence, even if the film is a thin film having a thickness of not larger than 10 μm, it can still be suitably used for electronics applications, for example, a substrate for an electric wiring board having a copper foil laminated thereon. Further, it can also be used as substrates for a flexible circuit board, a TAB (Tape Automated Bonding) tape and an LOC (Lead On Chip) tape. In addition, it can also be used as a base film of a magnetic recording tape.

EXAMPLES

Hereinafter, the process of the present invention will be described in more detail with reference to examples. However, these examples do not limit the scope of the present invention in any way.

Logarithmic viscosity of polyamic acid was measured at a polymer concentration in NMP of 0.5 g/100 ml at 35° C. A degree of swelling was calculated from a ratio between a weight of a film when it was swollen and a weight of the film when it was dry. That is, the degree of swelling was calculated from the following expression:

$$\text{Degree of Swelling} = (W2/W1 - 1) \times 100$$

wherein W1 represents a weight of a film when it is dry and W2 represents a weight of the film when it is swollen. Further, measurement of tensile strength was carried out by use of a sample having a size of 50 mm×10 mm at a pulling rate of 5 mm/min by means of ORIENTECH UCT-1T.

A percentage of isoimido groups and a percentage of imido groups were determined from ratios of peak intensities measured by a transmission technique by use of a Fourier transform infrared spectrometer (Nicolet Magna 750) in the following manner.

Percentage of Isoimido Groups (%)=$(A_{920}/A_{1024})/11.3 \times 100$ $A_{920}$: absorption intensity at 920 cm$^{-1}$ isoimido bond derived peak of sample $A_{1024}$: absorption intensity at 1024 cm$^{-1}$ benzene ring derived peak of sample Percentage of Imido Groups (%)=$(A_{720}/A_{1024})/5.1 \times 100$ $A_{720}$: absorption intensity at 720 cm$^{-1}$ imido bond derived peak of sample $A_{1024}$: absorption intensity at 1024 cm$^{-1}$ benzene ring derived peak of sample

Example 1

To a reactor equipped with a thermometer, agitator and raw material feeding port, 910 ml of N-methyl-2-pyrolidone (NMP) dehydrated with a molecular sieve under a nitrogen atmosphere was added, and 19.9 g of paraphenyldiamine was further added thereto. Subsequently, they were completely dissolved and then cooled in a ice bath. To the cooled diamine solution, 40.1 g of pyromellitic dianhydride was added, and the mixture was allowed to react for one hour. Then, after the mixture was allowed to react for another two hours at room temperature, 0.011 g of aniline was added, and the resulting mixture was allowed to react for another thirty minutes. Logarithmic viscosity of the obtained polyamic acid solution was 4.12.

The amic acid solution was cast on a glass plate by use of a doctor blade having a thickness of 1.5 mm, immersed in a dicyclohexylcarbodiimide (DCC) bath comprising a N-methyl-2-pyrolidone solution having a DCC concentration of 28 wt % so as to allow the cast solution to react and solidify for eight minutes, removed from the glass plate, and then allowed to react for another 12 minutes, thereby obtaining a gelled film. The gelled film had a percentage of isoimido groups of 98%, but no imido groups were detected in the film.

After the polyimide precursor was immersed in NMP which was a swelling solvent at room temperature for 15 minutes, the film was held with chucks and then biaxially stretched in two directions perpendicular to each other simultaneously at a stretch ratio of 2.3 times. Then, the stretched film was immersed in isopropanol so as to extract the swelling solvent and the like from the imide precursor.

The stretched film was fixed in a frame and then dried at 200° C. Then, the dried film was heat-treated stepwise to imidate the film. Eventually, the film was heated to 450° C., thereby obtaining a polyparaphenylenepyromellitimide film. The obtained polyparaphenylenepyromellitimide film had a thickness of 7.0 μm, tensile elastic moduli in the stretch directions perpendicular to each other of 20.3 GPa and 21.7 GPa, tensile strengths in the two stretch directions of 0.37 GPa and 0.37 GPa, respectively, and elongations in the two stretch directions of 2.6% and 2.7%, respectively. Further, the film also had a refractive index nz in a thickness direction of 1.599, a density of 1.523 g/cm$^3$ and a percentage of imido groups of 99%.

Examples 2 to 5

Polyimide films were obtained in the same manner as in Example 1 except for stretch ratios in simultaneous biaxial stretching and final heat treatment temperatures. The results are shown in Table 1.

Example 6

A polyamic acid solution was prepared in the same manner as in Example 1.

The polyamic acid solution was cast on a glass substrate by use of a doctor blade having a thickness of 1.0 mm and then immersed in a dehydration/condensation bath comprising 800 ml of NMP, 600 ml of acetic anhydride and 300 ml of pyridine for 10 minutes so as to gel the cast solution. Then, the gelled cast solution was removed from the glass substrate to obtain a gelled film. The gelled film had a percentage of imido groups of 43% and a percentage of isoimido groups of 35%.

The obtained gelled film was immersed in NMP at room temperature for 15 minutes. Then, the film was held on both sides by chucks and biaxially stretched in two axial directions simultaneously at a stretch ratio of 1.9 times and a stretch rate of 5 mm/sec at room temperature. The gelled film had a degree of swelling of 1,810% at the beginning of stretching.

The stretched gelled film was held in a frame and then dried and heat-treated by use of a hot air circulating oven by increasing a temperature stepwise between 160° C. and 450° C. so as to obtain a polyimide film. The obtained polyimide film had a thickness of 9 μm, tensile elastic moduli measured in the two directions perpendicular to each other in a plane of 17.9 GPa and 16.0 GPa, tensile strengths in the two directions of 0.39 GPa and 0.35 GPa, and elongations in the two directions of 5.1% and 4.9%. Further, the film also had a refractive index nz in a thickness direction of 1.573, a density of 1.508 g/cm$^3$ and a percentage of imido groups of 99%.

Examples 7 and 8

Polyimide films were obtained in the same manner as in Example 6 except for final heat treatment temperatures. The results are shown in Table 1.

Example 9

A polyamic acid solution was prepared in the same manner as in Example 1.

The polyamic acid solution was cast on a PET film by use of a doctor blade having a thickness of 0.6 mm and then immersed in a bath comprising 100 ml of acetic anhydride, 25 g of triethylenediamine and 800 ml of N-methyl-2-pyrolidone so as to allow the cast solution to react and solidify for 10 minutes. Then, the solidified solution was removed from the PET film and then allowed to react for another 10 minutes which added up to 20 minutes in total, thereby obtaining a gelled film. No amide bond derived peak was observed, and the gelled film had a percentage of imido groups of 99%. The obtained gelled film was immersed in NMP at room temperature for 15 minutes. Then, the resulting film was held on both sides by chucks and then biaxially stretched in two axial directions simultaneously at a stretch ratio of 1.2 times and a stretch rate of 5 mm/sec at room temperature. The gelled film had a degree of swelling of 1,600% at the beginning of stretching.

The stretched gelled film was held in a frame and then dried by use of a hot air circulating oven at 200° C. for 20 minutes. Then, the temperature was gradually increased to 450° C. so as to obtain a polyimide film. The obtained polyimide film had a thickness of 9 μm, tensile elastic moduli measured in the two directions perpendicular to each other in a plane of 13.8 GPa and 16.9 GPa, elongations in the two directions of 13.1% and 10.0%, and tensile strengths in the two directions of 0.37 GPa and 0.40 GPa. Further, the film also had a refractive index nz in a thickness direction of 1.555, a density of 1.490 g/cm$^3$ and a percentage of imido groups of 99%.

Examples 10 and 11

Polyimide films were obtained in the same manner as in Example 9 except for stretch ratios in simultaneous biaxial stretching. The results are shown in Table 1.

Comparative Example 1

A gelled film was prepared in the same manner as in Example 3, dried at 250° C. for 20 minutes without being stretched, and then heat-treated at 200° C. for 20 minutes so as to obtain a polyimide film.

The film had a thickness of 6 μm, tensile elastic moduli measured in two directions perpendicular to each other in a plane of 8.22 GPa and 7.9 GPa, elongations in the two directions of 7.6% and 7.2%, and tensile strengths in the two directions of 0.16 GPa and 0.16 GPa. Further, the film also had a refractive index nz in a thickness direction of 1.665, a density of 1.588 g/cm$^3$ and a percentage of imido groups of 100%.

0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, and in which two directions each having a Young's modulus of higher than 10 GPa and perpendicular to each other are present in a film plane.

2. The polyimide film of claim 1, wherein the polyimide comprises a diamine component comprising 100 mol % of the p-phenylenediamine component and 100 mol % of the pyromellitic acid component.

3. The polyimide film of claim 1 or 2, wherein two directions each having a Young's modulus of higher than 12 GPa and perpendicular to each other are present in the film plane.

4. The polyimide film of claim 1, wherein the polyimide has a percentage of imido groups of not lower than 95%.

5. The polyimide film of claim 1, wherein the following relational expressions (1), (2) and (3) hold between a refractive index nz in a direction perpendicular to the film plane and a density d of the film:

$$1.61 > nz > 1.55 \tag{1}$$

$$1.57 > d > 1.46 \tag{2}$$

$$2.0d - 1.33 > nz > 1.5d - 0.77 \tag{3},$$

6. The polyimide film of claim 1, which has a tensile strength in one direction of not lower than 0.3 GPa.

7. A process for producing a polyimide film which comprises the steps of:
 (1) preparing a solution of polyamic acid in a solvent, the polyamic acid consisting essentially of a diamine component and a tetracarboxylic acid component, the diamine component comprising a p-phenylenediamine component whose amount is more than 80 mol % to 100 mol % and an aromatic diamine component other than p-phenylenediamine whose amount is 0 mol % to

TABLE 1

| | Stretch Ratio | Heat Treatment Temperature | nz | d | Thickness (μm) | Young's Modulus (GPa) | Strength (GPa) | Elongation (%) | Percentage of Imido Group (%) |
|---|---|---|---|---|---|---|---|---|---|
| Ex. 2 | 2.3 | 380° C. | 1.599 | 1.512 | 7 | 18.6 | 0.52 | 9.8 | 96 |
| | | | | | | 14.1 | 0.4 | 10.7 | |
| Ex. 3 | 2 | 450° C. | 1.572 | 1.524 | 9 | 15.9 | 0.4 | 5.4 | 100 |
| | | | | | | 17.7 | 0.41 | 4.3 | |
| Ex. 4 | 1.4 | 475° C. | 1.592 | 1.536 | 7 | 17.6 | 0.48 | 4.4 | 100 |
| | | | | | | 13.2 | 0.36 | 4.8 | |
| Ex. 5 | 1.8 | 475° C. | 1.584 | 1.531 | 7 | 16 | 0.42 | 4.1 | 100 |
| | | | | | | 16 | 0.42 | 4.2 | |
| Ex. 7 | 1.9 | 350° C. | 1.566 | 1.501 | 8 | 17.3 | 0.3 | 3.3 | 97 |
| | | | | | | 16.1 | 0.3 | 3.3 | |
| Ex. 8 | 1.9 | 400° C. | 1.567 | 1.491 | 8 | 14 | 0.3 | 4.2 | 100 |
| | | | | | | 18 | 0.31 | 2.8 | |
| Ex. 10 | 1.4 | 450° C. | 1.550 | 1.476 | 6 | 16.3 | 0.31 | 4.4 | 100 |
| | | | | | | 20 | 0.37 | 3.7 | |
| Ex. 11 | 1.25 | 450° C. | 1.553 | 1.489 | 7 | 17.3 | 0.32 | 4.4 | 100 |
| | | | | | | 16 | 0.32 | 4.7 | |

Ex.: Example

What is claimed is:

1. A polyimide film which comprises a polyimide consisting essentially of a diamine component and a tetracarboxylic acid component, the diamine component comprising a p-phenylenediamine component whose amount is more than 80 mol % to 100 mol % and an aromatic diamine component other than p-phenylenediamine whose amount is less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N- dimethylacetamide, N-methylpyrrolidone and 1,3-dimethylimidazolidinone, (2) immersing a film obtained by flow casting the solution prepared in the above (1) on a substrate into an isoimidating solution produced by dissolving dicyclohexylcarbodiimide in at least one solvent selected from the above solvents, with the film being attached to the substrate, so as to form a gelled film in which at least a portion of the polyamic acid has been converted into a polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

8. The process of claim 7, wherein the gelled film in the step (2) has a percentage of isoimido groups of not lower than 90%.

9. The process of claim 7, wherein the gelled film to be subjected to biaxial stretching in the step (3) has a degree of swelling of 300 to 5,000%.

10. The process of claim 7, wherein the heat treatment in the step (4) is carried out at 300 to 550° C. with the film held at a specific length or under tension.

11. A process for producing a polyimide film which comprises the steps of:

(1) preparing a solution of polyamic acid in a solvent, the polyamic acid consisting of a diamine component and a tetracarboxylic acid component, the diamine component comprising a p-phenylenediamine component whose amount is more than 80 mol % to 100 mol % and an aromatic diamine component other than p-phenylenediamine whose amount is 0 mol % to less than 20 mol % and the tetracarboxylic acid component comprising pyromellitic acid whose amount is more than 80 mol % and an aromatic tetracarboxylic acid component other than pyromellitic acid whose amount is 0 mol % to less than 20 mol %, the solvent comprising at least one solvent selected from the group consisting of N,N-dimethylformamide, N,N-dimethylacetamide, N-methylpyrrolidone and 1,3-dimethylimidazolidinone, (2) immersing a film obtained by flow casting the solution prepared in the above (1) on a substrate into a solution comprising at least one solvent selected from the above solvents, acetic anhydride and an organic amine compound, with the film being attached to the substrate, so as to form a gelled film in which at least a portion of the polyamic acid has been converted into a polyimide or polyisoimide, (3) separating the obtained gelled film from the substrate, rinsing the film as required, and then biaxially stretching the film, and (4) subjecting the resulting film to heat treatment, as required, after rinsing the obtained biaxially stretched film to remove the solvent therefrom, so as to form a biaxially oriented polyimide film.

12. The process of claim 11, wherein the gelled film in the step (2) has a total of percentages of imido groups and isoimido groups of 20 to 100%.

13. The process of claim 11, wherein the gelled film to be subjected to biaxial stretching in the step (3) has a degree of swelling of 300 to 5,000%.

14. The process of claim 11, wherein the heat treatment in the step (4) is carried out at 300 to 550° C. with the film held at a specific length or under tension.

15. The process of claim 11, wherein the organic amine compound used in the step (2) is pyridine or picoline.

16. The process of claim 11, wherein the organic amine compound used in the step (2) is triethylenediamine or 4-dimethylaminopyridine.

* * * * *